(12) United States Patent
Fu et al.

(10) Patent No.: US 11,023,717 B2
(45) Date of Patent: Jun. 1, 2021

(54) METHOD, APPARATUS, DEVICE AND SYSTEM FOR PROCESSING COMMODITY IDENTIFICATION AND STORAGE MEDIUM

(71) Applicant: BAIDU ONLINE NETWORK TECHNOLOGY (BEIJING) CO., LTD., Beijing (CN)

(72) Inventors: Peng Fu, Beijing (CN); Kuipeng Wang, Beijing (CN); Yuexiang Hu, Beijing (CN); Qiang Zhou, Beijing (CN); Yanwen Fan, Beijing (CN); Haofeng Kou, Beijing (CN); Shengyi He, Beijing (CN); Renyi Zhou, Beijing (CN); Yanghua Fang, Beijing (CN); Yingze Bao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 154 days.

(21) Appl. No.: 16/354,054

(22) Filed: Mar. 14, 2019

(65) Prior Publication Data
US 2020/0005025 A1    Jan. 2, 2020

(30) Foreign Application Priority Data
Jun. 29, 2018   (CN) .......................... 201810701271.8

(51) Int. Cl.
*G06K 9/00*    (2006.01)
*H04N 13/02*   (2006.01)
(Continued)

(52) U.S. Cl.
CPC ..... *G06K 9/00335* (2013.01); *G06K 9/00771* (2013.01); *G06K 9/6202* (2013.01);
(Continued)

(58) Field of Classification Search
USPC ........ 382/100, 103, 106–107, 115, 118, 155, 382/162, 168, 173, 181, 190, 219, 224,
(Continued)

(56) References Cited

U.S. PATENT DOCUMENTS 9,076,177 B2 *   7/2015   Gotanda .......... G06Q 30/0623
10,217,120 B1 *  2/2019   Shin ................ G06Q 10/06393
(Continued)

FOREIGN PATENT DOCUMENTS

CN    105229582 A    1/2016
CN    107454964 A    12/2017
(Continued)

OTHER PUBLICATIONS

The Chinese First Examination Report of corresponding Chinese application No. 201810701271.8, dated Jul. 22, 2019.
(Continued)

*Primary Examiner* — Seyed H Azarian
(74) *Attorney, Agent, or Firm* — J.C. Patents

(57) ABSTRACT

The present application provides a method, an apparatus, a device and a system for processing commodity identification and a storage medium, where the method includes: receiving image information transmitted by a camera apparatus and a distance signal transmitted by a distance sensor corresponding to the camera apparatus; determining a start frame and an end frame for a pickup behavior of a user according to the image information and the distance signal; and determining, according to the start frame and the end frame for the pickup behavior of the user, information of a commodity taken by the user. By performing a commodity identification on the start frame and the end frame for the pickup behavior of the user, and determining the information of the commodity taken by the user, commodity identification efficiency is effectively improved.

18 Claims, 5 Drawing Sheets

(51) Int. Cl.
*G06K 9/62* (2006.01)
*G06N 3/08* (2006.01)
*G06N 5/02* (2006.01)

(52) U.S. Cl.
CPC ............. *G06K 9/6229* (2013.01); *G06N 3/08* (2013.01); *G06N 5/02* (2013.01)

(58) Field of Classification Search
USPC .............. 382/232, 254, 274, 276, 291, 321; 348/50, 64, 69
See application file for complete search history.

(56) References Cited

U.S. PATENT DOCUMENTS 10,592,959 B2 * 3/2020 Wilkinson ............. G06Q 90/00
10,713,670 B1 * 7/2020 Moon ................. G06Q 30/0201
2018/0107971 A1 * 4/2018 Vukin .................. G06Q 10/087
2019/0073880 A1 * 3/2019 Nobuoka ............. G06K 9/4609
2019/0147615 A1 * 5/2019 Fujiwara ............ G06Q 30/0265
382/103

FOREIGN PATENT DOCUMENTS

| CN | 107622570 A | 1/2018 |
| CN | 107944960 A | 4/2018 |
| CN | 108171172 A | 6/2018 |
| CN | 108198331 A | 6/2018 |
| CN | 108268134 A | 7/2018 |

OTHER PUBLICATIONS

Notice of Allowance of the priority Chinese application No. 201810701271.8.

* cited by examiner

METHOD, APPARATUS, DEVICE AND SYSTEM FOR PROCESSING COMMODITY IDENTIFICATION AND STORAGE MEDIUM

CROSS-REFERENCE TO RELATED APPLICATION

This application claims priority to Chinese Patent Application No. 201810701271.8, filed on Jun. 29, 2018, which is hereby incorporated by reference in its entirety.

TECHNICAL FIELD

The present application relates to the field of image identification technologies and, in particular, to a method, an apparatus, a device and a system for processing commodity identification and a storage medium.

BACKGROUND

With the rapid development of science and technology, a self-service retail mode is entering people's lives gradually. In a self-service retail system, how to correctly identify which commodities a user has taken from a storage rack is an important technology problem, which plays an important role on subsequent commodity management.

In the prior art, an image is usually collected with a camera, a commodity detection is performed for each frame of image in real time using a commodity identification model, and whether a commodity has been taken away or put back is determined by a change in detection results.

However, for an existing commodity identification method where the commodity detection is performed for each frame, the processing efficiency is low.

SUMMARY

The present application provides a method, an apparatus, a device and a system for processing commodity identification and a storage medium, aiming at solving defects such as low commodity detection efficiency in the prior art.

A first aspect of the present application provides a method for processing commodity identification, including:

receiving image information transmitted by a camera apparatus and a distance signal transmitted by a distance sensor corresponding to the camera apparatus;

determining a start frame and an end frame for a pickup behavior of a user according to the image information and the distance signal; and determining, according to the start frame and the end frame for the pickup behavior of the user, information of a commodity taken by the user.

A second aspect of the present application provide an apparatus for processing commodity identification, including:

a receiving module, configured to receive image information transmitted by a camera apparatus and a distance signal transmitted by a distance sensor corresponding to the camera apparatus;

a determining module, configured to determine a start frame and an end frame for a pickup behavior of a user according to the image information and the distance signal; and a processing module, configured to determine, according to the start frame and the end frame for the pickup behavior of the user, information of a commodity taken by the user.

A third aspect of the present application provides a computer device, including: at least one processor and a memory;

where the memory is stored with a computer program; the at least one processor executes the computer program stored by the memory to implement the method provided above according to the first aspect.

A fourth aspect of the present application provides a system for processing commodity identification, including: an AI chip, one or more camera apparatuses, and one or more distance sensors;

where each of the camera apparatuses corresponds to one or more distance sensors;

each of the camera apparatuses is connected to the AI chip, and configured to transmit collected image information of a commodity to the AI chip;

each of the distance sensors is connected to the AI chip, and configured to transmit a detected distance signal to the AI chip;

the AI chip is configured to execute a computer program to implement the method provided above according to the first aspect.

A fifth aspect of the present application provides a computer readable storage medium stored with a computer program, which, when being executed, causes the method provided above according to the first aspect to be implemented.

In the method, the apparatus, the device and the system for processing commodity identification and the storage medium provided in the present application, by performing a commodity identification on the start frame and the end frame for the pickup behavior of the user, and determining the information of the commodity taken by the user, commodity identification efficiency is effectively improved. Moreover, the determination of the start frame and the end frame for the pickup behavior of the user in conjunction with the image information captured by the camera apparatus and the distance signal detected by the distance sensor may avoid misjudgment of the pickup behavior of the user, thereby improving accuracy of judgment of the pickup behavior of the user.

BRIEF DESCRIPTION OF DRAWINGS

In order to describe technical solutions in embodiments of the present application or the prior art more clearly, accompanying drawings used in the description of embodiments or the prior art will be briefly described hereunder. Obviously, the described drawings are merely some embodiments of present application. For persons skilled in the art, other drawings may be obtained based on these drawings without any creative work.

Figure 1:
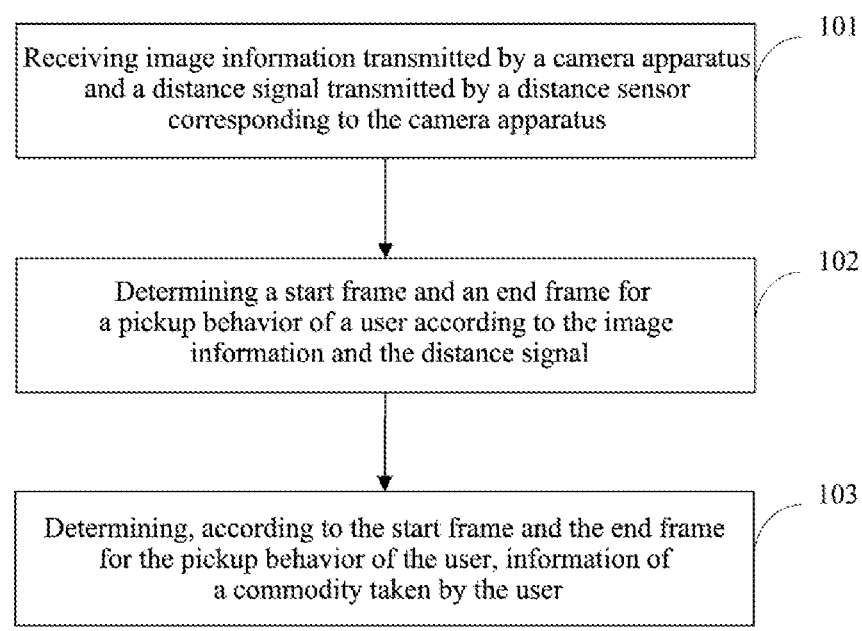
FIG. 1 is a schematic flow chart of a method for processing commodity identification according to an embodiment of the present application.

Specific embodiments of the present application have been illustrated by the above drawings, which will be described in more details hereinafter. These drawings and literal descriptions are not intended to limit the scope of the present disclosure in any way, but concepts of the present application will be described to persons skilled in the art with reference to the specific embodiments.

DESCRIPTION OF EMBODIMENTS

In order to make objectives, technical solutions, and advantages of embodiments of the present application clearer, the technical solutions in the embodiments of the present application will be described clearly and completely hereinafter with reference to the accompanying drawings in the embodiments of the present application. Obviously, the described embodiments are only a part of embodiments of the present application, rather than all embodiments of the present application. All other embodiments obtained by persons skilled in the art based on the embodiments of the present application without any creative effort shall fall within the protection scope of the present application.

First of all, explanations are made to the terms involved in the present application:

Camera apparatus: it refers to an apparatus that is placed above commodities in a storage rack for monitoring status of the commodities, it may be in particular a camera or other camera capable apparatuses. The camera apparatus is connected to a computer device that performs data processing, such as an AI chip or other implementable computer devices. The camera apparatus captures image information of commodities within its coverage in real time and transmits the same to the AI chip, while the AI chip performs corresponding processing according to the image information.

Distance sensor: it refers to a sensor that is placed above the commodities in the storage rack for detecting objects within its detection area range and generating detection information. It may be in particular a TOF (Time of Flight ranging) sensor or various sensors that can detect an object within a detection area and generate corresponding detection information (e.g., a signal or a value), such as an ultrasonic sensor, an infrared light switch, an infrared fence, a microwave ranging sensor, etc. Due to limitations on a detection angle of the distance sensor, the coverage area corresponding to one camera often requires multiple distance sensors for a complete coverage. Both the camera apparatus and the distance sensor are connected to the AI chip to achieve information interaction and commodity identification processing.

Moreover, the terms such as "first" and "second" are used for descriptive purposes only, which cannot be construed as indicating or implying a relative importance or implicitly indicating the number of technical features indicated. In the description of the embodiments below, unless specifically defined otherwise, the meaning with regard to "multiple" indicates more than two.

The following specific embodiments may be combined with each other, and for the same or similar concepts or processes, details may not be described again in some embodiments. The embodiments of the present disclosure will be described below with reference to the accompanying drawings.

The method for processing the commodity identification provided in the embodiments of the present application is applicable to a system for processing commodity identification described below: the system for processing the commodity identification includes: a computer device, one or more camera apparatuses placed above commodities in a storage rack, and one or more distance sensors corresponding to a capturing range of each camera apparatus. The computer device may be an AI (Artificial Intelligence) chip, and each camera apparatus and a corresponding distance sensor are connected to the AI chip to achieve information interaction. The data for final identification of information of a commodity taken by the user can be stored to provide a basis for subsequent commodity management. For example, public users' preferences may be analyzed according to the users' behaviors, so that popular commodities are placed at a location more easily observable and accessible to the users to increase sales of commodities. Further, more bases are provided for works such as subsequent financial statistics and so on.

Embodiment 1

This embodiment provides a method for processing commodity identification, which is used for performing commodity identification processing. An executive subject for this embodiment is an apparatus for processing commodity identification (hereinafter referred to as a processing apparatus). The processing apparatus may be provided in a computer device, such as an AI chip.

FIG. 1 shows a schematic flow chart of a method for processing commodity identification according to this embodiment, where the method includes:

Step 101: receiving image information transmitted by a camera apparatus and a distance signal transmitted by a distance sensor corresponding to the camera apparatus.

Specifically, the camera apparatus captures image information of a commodity within its capturing range in real time and transmits the same to the processing apparatus. The transmission may be performed in real time or periodically. The image information may be image data information or video data information. The image information may include a camera apparatus identifier, image identification information (such as an image name, number, etc.), a capturing time corresponding to an image frame, and specific image data. The distance sensor detects an object within its detection area in real time, and generates corresponding detection information, such as a signal or a value, and transmits the detected distance signal to the processing apparatus, in transmitting the distance signal, a distance sensor identifier and a detection time may also be carried, or when the distance signal is received, the processing apparatus records a receiving time of the distance signal accordingly. The processing apparatus may receive the image information transmitted by the camera apparatus and the distance signal transmitted by the distance sensor corresponding to the camera apparatus. A corresponding relationship between a camera apparatus identifier and a distance sensor identifier may be pre-configured in the processing apparatus. It is also possible to configure different interfaces for different cameras and different distance sensors. The processing apparatus determines, according to a receiving interface, the camera apparatus and the distance sensor that transmit data.

Optionally, the number of distance sensors corresponding to one camera apparatus may be set according to the capturing range of the camera apparatus used and a detection range of the distance sensor and by setting distance between the camera apparatus and the distance sensor on the storage rack. For example, a camera is adopted as the camera apparatus, and a TOF sensor is adopted as the distance sensor. The camera's capturing range requires three TOF sensors to cover, and then three distance sensors are provided within the camera's capturing range to detect distance signals.

Step 102: determining a start frame and an end frame for a pickup behavior of a user according to the image information and the distance signal.

Specifically, the image information and the distance signal are used together to trigger the pickup behavior of the user, so as to determine the start frame and the end frame for the pickup behavior of the user, thereby avoiding false triggering of the pickup behavior of the user.

Exemplarily, an easy in strict out rule may be used, that is, when it is determined according to any one of the image information and the distance signal that there is a target object extends in the storage rack, it is determined that the pickup behavior of the user starts; when it is determined according to both the image information and the distance signal that there is a target object extends out the storage rack, it is determined that the pickup behavior of the user ends. Moreover, a frame preceding where the pickup behavior of the user starts is determined as the start frame for the pickup behavior of the user, and a frame next to where the pickup behavior of the user ends is determined as the end frame for the pickup behavior of the user. Optionally, since respective frames have the same image content before the pickup behavior of the user starts, any frame may be used as the start frame for the pickup behavior of the user; since many frames have the same content after the pickup behavior of the user ends, any of the same frames subsequent to the end of the pickup behavior of the user is used as the end frame for the pickup behavior of the user, both cases may be provided specifically according to actual requirements, which is not limited in this embodiment.

Exemplarily, a strict in strict out rule or other implementable rules may also be used, the case may be provided specifically according to actual requirements, which is not limited in this embodiment.

Optionally, after determining the start frame and the end frame for the pickup behavior of the user, the processing apparatus may stores the start frame and the end frame, in particular, upload them to the cloud via the network. Optionally, the image information corresponding to the start frame and the end frame may be stored, for example, a video where the start frame and the end frame are located is stored. The image information may also be jpeg (Joint Photographic Experts Group) compressed and then uploaded to the cloud via the network.

Step 103: determining, according to the start frame and the end frame for the pickup behavior of the user, information of a commodity taken by the user.

Specifically, after determining the start frame and the end frame for the pickup behavior of the user, the processing apparatus determines, according to the start frame and the end frame for the pickup behavior of the user, information of the commodity taken by the user, for example, the information of the commodity taken by the user is determined by identifying which commodity is missing from the end frame relative to the start frame.

Exemplarily, the information of the commodity missing from the end frame relative to the start frame is identified using a preset commodity identification model or the information of the commodity taken by the user is determined using both the preset commodity identification model and a different region detection algorithm, provided that the commodity missing from the end frame relative to the start frame can be identified, and the identification method is not limited in this embodiment.

In the method for the processing commodity identification according to this embodiment, by performing a commodity identification on the start frame and the end frame for the pickup behavior of the user, and determining the information of the commodity taken by the user, commodity identification efficiency is effectively improved. Moreover, the determination of the start frame and the end frame for the pickup behavior of the user in conjunction with the image information captured by the camera apparatus and the distance signal detected by the distance sensor may avoid misjudgment of the pickup behavior of the user, thereby improving accuracy of judgment of the pickup behavior of the user.

Embodiment 2

This embodiment further supplements the method provided in Embodiment 1.

As an implementation manner, on the basis of Embodiment 1 described above, optionally, Step 102 specifically includes:

performing difference identification between a next frame and a preceding frame for the image information to determine whether there is a target object extends in or extends out; and determining, according to the distance signal, whether there is a target object extends in or extends out, where the next frame and the preceding frame are adjacent frames, or the next frame is spaced apart from the preceding frame by a preset number of frame;

if it is identified according to the image information that a target next frame has a target object extending in relative to a target preceding frame, then determining the target preceding frame as the start frame for the pickup behavior of the user;

if it is determined according to the distance signal that there is a target object extends in, then determining a frame in the image information corresponding to a time of the distance signal as the start frame for the pickup behavior of the user;

if it is determined according to the image information that a target next frame has a target object extending out relative to a target preceding frame and it is determined according to the distance signal that there is a target object extends out, then determining the target next frame as the end frame for the pickup behavior of the user.

Specifically, an easy in rule is used in determining the start frame, while a strict out rule is used in determining the end frame. The easy in strict out rule is shown in Table 1. That is, regardless of that it is based on the image information or the distance signal, as long as it is determined that there is a target object extends in, it is determined that the pickup behavior starts, and the start frame is selected; whereas when it is determined according to the image information that the target object extends out the storage rack, and it is also determined according to the distance signal that the target object extends out the storage rack, then it can be determined the pickup behavior ends.

TABLE 1

| According to image information | According to distance signal | Pickup behavior starts | Pickup behavior ends |
|---|---|---|---|
| True | False | True | False |
| False | True | True | False |

TABLE 1-continued

| According to image information | According to distance signal | Pickup behavior starts | Pickup behavior ends |
|---|---|---|---|
| True | True | True | True |
| False | False | False | False |

Specifically, when no target object extends in, images captured by the camera apparatus are the same in terms of frames, and there is no difference; when there is a target object extends in the storage rack, there will be a difference between captured image frames and image frames where no target object extends in the storage rack. Therefore, when it is determined that there is a difference between a next frame and a preceding frame, it indicates that there is a target object extends in the storage rack, it may record that the pickup behavior starts, and any frame prior to the start is selected as the start frame. After it is recorded that the pickup behavior starts, it is continue to identify a difference between the next frame and the preceding frame of the image information transmitted by the camera apparatus; if there is no difference between consecutive frames (for example, 20 frames), it is determined that the target object extends out the storage rack, alternatively, if the next frame is spaced apart from the preceding frame by a preset number of frames, the number of times without the difference can also be set, for example, if there is no difference for 5 consecutive times, it is determined that the target object extends out the storage rack, this is not limited specifically. At this time, it cannot be determined that the pickup behavior of the user ends, because the reason why there is no difference between consecutive frames may result from circumstances such as when the user moves slowly or views with a commodity. Therefore, it is desirable to determine the end of the pickup behavior of the user in conjunction with the distance signal.

When no target object extends in the storage rack, the distance sensor detects that a background distance signal is a stable signal; when a target object extends in a detection area of the distance sensor, the distance signal detected by the distance sensor has a significant jump relative to the background distance signal, and it can be then determined that the target object extends in the storage rack; when the distance signal returns to a vicinity of the background distance signal, it can be then determined that the target object leaves the storage rack, a motion detection on such an intact in/out the storage rack is completed. When it is determined that the target object extends in the storage rack, it is then determined that the pickup behavior of the user starts, and a frame may be selected from the image information according to the time of the distance signal as the start frame for the pickup behavior of the user, where the time of the distance signal may be a time when the distance sensor generates the distance signal or a time when the distance sensor transmits the distance signal to the processing apparatus or a time when the processing apparatus receives the distance signal, which is not limited specifically. The selected frame may be a frame of image captured at the time of the distance signal, or may be an adjacent frame prior to or subsequent to that frame of image captured at that time, or a frame spaced apart from that frame of image captured at that time by a certain number of frames. In order to facilitate subsequent commodity identification, the selected start frame may be an image frame prior to the start of the pickup behavior of the user.

The determination of the end of the pickup behavior of the user, that is, the end frame, needs to be made in conjunction with both the image information and the distance information. When it is determined according to the image information that the target object extends out the storage rack, and meanwhile it is determined according to the distance information that the target object extends out the storage rack, it can be determined that the pickup behavior of the user ends. The selected end frame may be an image frame subsequent to the end of the pickup behavior of the user. In this way, there will be no interference from the target object in the start frame and the end frame, but only a commodity difference exists in the start frame and the end frame, so that it is convenient for commodity identification.

Optionally, the difference identification between the next frame and the preceding frame for the image information may be performed using a preset first convolutional neural network CNN model, where the first convolutional neural network CNN model is trained using multiple image frames in training data and inter-frame difference annotated data. The specific training process is coincide with the prior art and will not be described again.

Optionally, the determining, according to the distance signal, whether there is a target object extends in or extends out includes: comparing the distance signal with a currently stored background distance signal, where the currently stored background distance signal is a stable signal transmitted by the distance sensor when there is no pickup from the user; if the distance signal has a significant jump relative to the currently stored background distance signal, then determining that there is a target object extends in; after it is determined that there is a target object extends in, if the distance signal is restored to coincide with the currently stored background distance signal, then determining that the target object extends out. It can be understood that, as a state of commodities on the storage rack changes, the background distance signal also changes, so the stored background distance signal needs to be constantly updated.

Since during difference identification between the next frame and the preceding frame, if the next frame and the preceding frame are adjacent frames, the difference identification has a high frame rate and there is a small continuous change between the preceding frame and the next frame, resulting in low identification efficiency. In order to improve the identification efficiency, the difference identification may be performed on the preceding frame and the next frame that are spaced apart from each other by a preset number of frames. For example, the next frame is spaced apart from the preceding frame by 4 frames, 6 frames, 7 frames, etc. The preset number of frames may be set for a specific spacing according to actual requirements, which is not limited in this embodiment.

Figure 2:
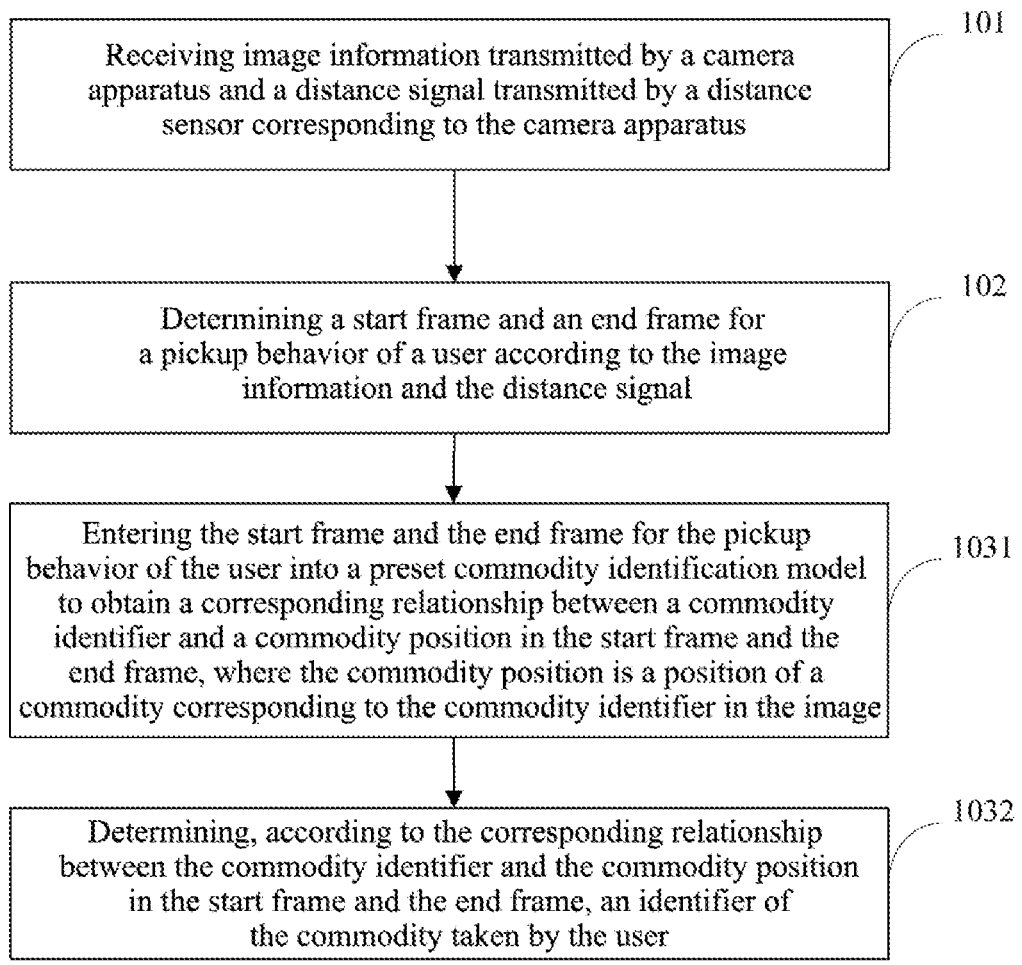
FIG. 2 is a schematic flow chart of a method for processing commodity identification according to another embodiment of the present application.

FIG. 2 shows a schematic flow chart of a method for processing commodity identification according to this embodiment.

As another implementation manner, on the basis of Embodiment 1 described above, optionally, Step 103 specifically includes:

Step 1031, entering the start frame and the end frame for the pickup behavior of the user into a preset commodity identification model to obtain a corresponding relationship between a commodity identifier and a commodity position in the start frame and the end frame, where the commodity position is a position of a commodity corresponding to the commodity identifier in the image; and Step 1032, determining, according to the corresponding relationship between the commodity identifier and the commodity position in the start frame and the end frame, an identifier of the commodity taken by the user.

Specifically, the commodity identification model is pretrained using commodity training data, and the start frame and the end frame for the pickup behavior of the user are entered into the preset commodity identification model to obtain the corresponding relationship between the commodity identifier and the commodity position in the start frame and the end frame, that is, to identify which commodities are in the start frame and a position of each commodity in the start frame image, along with which commodities are in the end frame and a position of each commodity in the end frame image. The commodity position refers to the position of the commodity corresponding to the commodity identifier in the start frame image or the end frame image. That is, a coordinate system is established with regard to the frame images. For example, a lower left vertex of the image is taken as a coordinate origin, a lower line of the image is taken as a X-axis and a left line is taken as a Y-axis to establish the coordinate system where coordinates of each commodity in each image are obtained. Certainly, the coordinate origin may be provided at an arbitrary position of the image and may be provided specifically according to actual requirements, which is not limited in this embodiment.

After the corresponding relationship between the commodity identifier and the commodity position in the start frame and the end frame is determined, the identifier of the commodity taken by the user may be then determined according to the corresponding relationship between the commodity identifier and the commodity position in the start frame and the end frame.

Exemplarily, commodities in the start frame and the end frame may be compared in terms of their identifiers and positions. If a commodity identifier corresponding to a certain position is missing from the end frame compared to the start frame, it may be then determined that the user has taken a commodity corresponding to that commodity identifier.

Figure 3:
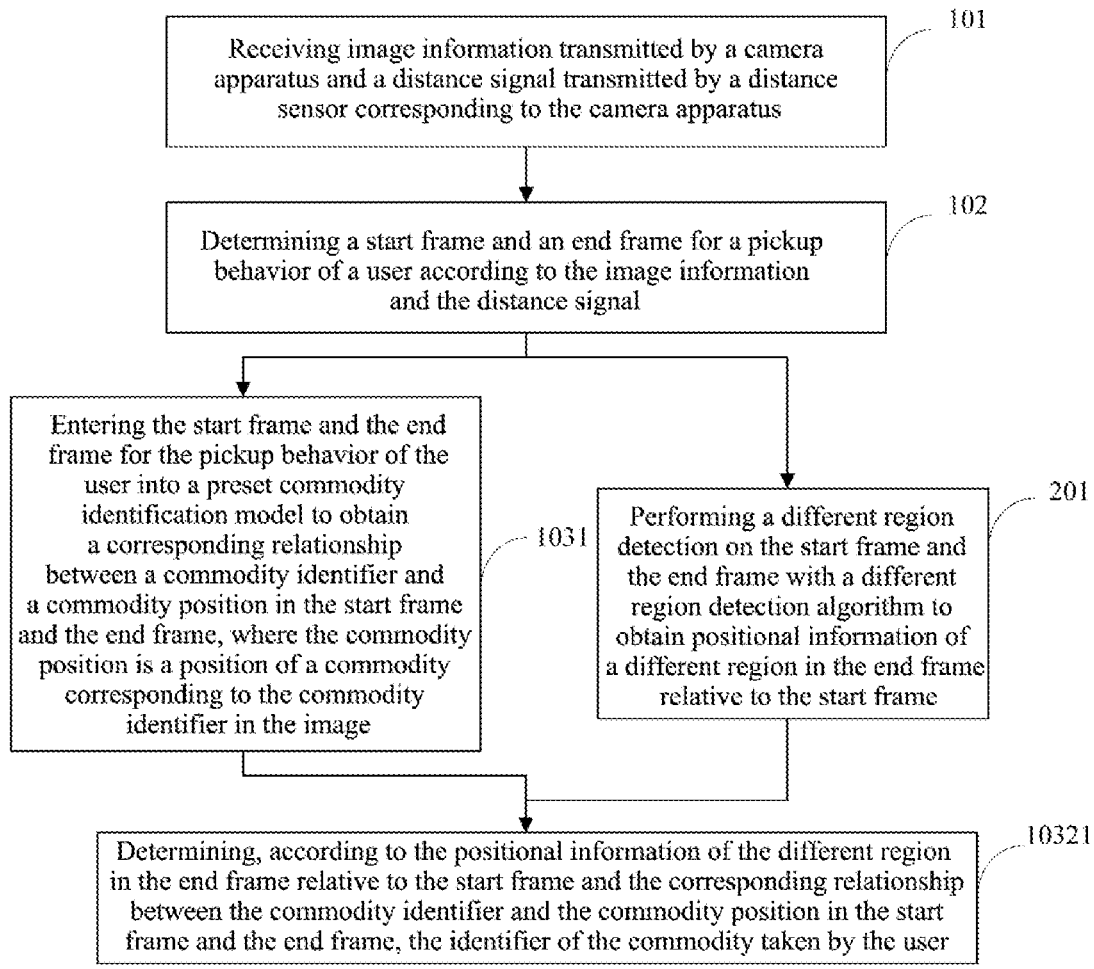
FIG. 3 is a schematic flow chart of another method for processing commodity identification according to another embodiment of the present application.

FIG. 3 shows a schematic flow chart of another method for processing commodity identification according to this embodiment.

Optionally, before Step 1032, the method may further include:

Step 201, performing a different region detection on the start frame and the end frame with a different region detection algorithm to obtain positional information of a different region in the end frame relative to the start frame; correspondingly, Step 1032 includes:

Step 10321, determining, according to the positional information of the different region in the end frame relative to the start frame and the corresponding relationship between the commodity identifier and the commodity position in the start frame and the end frame, the identifier of the commodity taken by the user.

Specifically, after the corresponding relationship between the commodity identifier and the commodity position in the start frame and the end frame is obtained, the different region detection may be performed on the start frame and the end frame with the different region detection algorithm to obtain the positional information of the different region in the end frame relative to the start frame. For the different region detection algorithm, any algorithm implementable in the prior art may be used, and details will not be described herein again.

After the positional information of the different region in the end frame relative to the start frame is obtained, the identifier of the commodity taken by the user may be then determined according to the positional information of the different region in the end frame relative to the start frame and the corresponding relationship between the commodity identifier and the commodity position in the start frame and the end frame.

Exemplarily, commodity identifiers corresponding to different region positions may be obtained and searched from the corresponding relationship between the commodity identifier and the commodity position in the start frame and the end frame according to the positional information of the different region in the end frame relative to the start frame.

Optionally, Step 201 may specifically include: performing a binary comparison on the start frame and the end frame to obtain the positional information of the different region in the end frame relative to the start frame.

Specifically, performing a binary comparison on two images to obtain the different region is a prior art, and details will not be described herein again.

Optionally, Step 201 may specifically include:

Step 2011, extracting a first high-dimensional feature map of the start frame and a second high-dimensional feature map of the end frame;

Step 2012, comparing the first high-dimensional feature map with the second high-dimensional feature map to obtain a feature point having a difference;

Step 2013, determining boundary coordinates of a different region in the second high-dimensional feature map relative to the first high-dimensional feature map according to the feature point having the difference, where the boundary coordinates are coordinates in a high-dimensional feature map coordinate system; and Step 2014, determining the positional information of the different region of the end frame relative to the start frame according to the boundary coordinates of the different region in the second high-dimensional feature map relative to the first high-dimensional feature map.

Specifically, since performing the binary comparison to obtain the positional information of the different region is susceptible to light, a change in light may also cause generation of the different region, thereby affecting accuracy of different region detection, therefore, the first high-dimensional feature map of the start frame and the second high-dimensional feature map of the end frame may also be extracted, and the positional information of the different region is obtained by comparing the high-dimensional feature maps. Specifically, after the first high-dimensional feature map of the start frame and the second high-dimensional feature map of the end frame are extracted, the first high-dimensional feature map may be compared with the second high-dimensional feature map to obtain the feature point having the difference, the boundary coordinates of the different region in the second high-dimensional feature map relative to the first high-dimensional feature map are determined according to the feature point having the difference, and the positional information of the different region of the end frame relative to the start frame is determined according to the boundary coordinates of the different region in the second high-dimensional feature map relative to the first high-dimensional feature map. During the comparison of the high-dimensional feature maps, a coordinate system used is a coordinate system established in the high-dimensional feature maps, and the high-dimensional feature maps have a certain proportion correspondence with the corresponding original image (the start frame or the end frame). Therefore, the establishment of the coordinate system also has a corresponding relationship, and the coordinates in the high-dimensional feature map coordinate system may be converted in a corresponding proportion into coordinates in an original image coordinate system. The boundary coordinates are coordinates in the high-dimensional feature map coordinate system.

Exemplarily, an extracted high-dimensional feature map (the first high-dimensional feature map or the second high-dimensional feature map) is 38*38*256, where 38*38 refers to pixel size of the high-dimensional feature map and 256 refers to the circumstance that each pixel (also referred to as a feature point) has a 256-dimensional feature parameter. For the establishment of the high-dimensional feature map coordinate system, an establishment rule may be the same as that for the original image coordinate system, which is that a lower left vertex of the high-dimensional feature map is taken as a coordinate origin, a lower line is taken as a X-axis, a left line is taken as a Y-axis, and then coordinates of each feature point are (Xi, Yj), where i=1, 2, . . . , 38, and j=1, 2, . . . , 38. For a feature point in the first high-dimensional feature map that have the same coordinates as in the second high-dimensional feature map, comparison is performed on it to determine whether there is a difference. If there is a difference, the feature point having those coordinates is determined as the feature point having the difference. Generally, a plurality of feature points having a difference are determined. Then, it is needed to determine boundary coordinates of these feature points having the difference, that is, the boundary coordinates of the different region in the second high-dimensional feature map relative to the first high-dimensional feature map are determined. The boundary coordinates of the different region in the second high-dimensional feature map relative to the first high-dimensional feature map are converted to those in the original image coordinate system, then the positional information of the different region of the end frame relative to the start frame is obtained.

It should be noted that, only an exemplary description is made herein, size of the high-dimensional feature map and a feature parameter dimension of the feature points may be specifically set according to actual requirements, for example, the size may be set to a range of (38*38)-(512*512), and the feature parameter dimension may be 128, 256, 512, etc., provided that a training on the model is performed as needed.

Optionally, Step 2011 may specifically include: extracting the first high-dimensional feature map of the start frame and the second high-dimensional feature map of the end frame using a preset second CNN model.

Specifically, the second CNN model may be a model pre-trained using training data, and details will not be described herein again. The second CNN model used in this embodiment may be an ssd-mobilenet (or referred to as mobilenet-ssd) model, and only several preceding neural network layers cony are reserved in consideration of performance.

Optionally, Step 2012 may specifically include: for any first feature point in the first high-dimensional feature map and a second feature point in the second high-dimensional feature map having same coordinates as the first feature point, calculating a distance between the first feature point and the second feature point, if the distance between the first feature point and the second feature point is greater than a preset threshold, then determining that there is a difference between the second feature point and the first feature point, and taking the second feature point as the feature point having the difference.

Exemplarily, a distance L between the first feature point and the second feature point is calculated: if the first feature point has a feature parameter of T=[t1, t2, . . . , t256], and the second feature point has a feature parameter of S=[s1, s2, . . . , s256], then:

$L=L1$ norm for a 256-dimensional channel/256=(|t1−s1|+|t2−s2|+ . . . +|t256−s256|)/256, where |t1−s1| represents an absolute value of t1−s1.

The preset threshold is an empirical value set according to an actual situation. In this embodiment, 38*38*256 is used for the high-dimensional feature map, and the preset threshold is preferably 1, that is, if the distance between the first feature point and the second feature point is greater than 1, it is then determined that there is a difference between the second feature point and the first feature point, and the second feature point is taken as the feature point having the difference.

According to the above process, feature points in the second high-dimensional feature map corresponding to those of the first high-dimensional feature map are compared one by one to determine one or more final feature points having the difference.

Optionally, after Step 102, the start frame and the end frame for the pickup behavior of the user may be stored. The start frame and the end frame may be stored, in particular, uploaded to the cloud through the network. Optionally, the image information corresponding to the start frame and the end frame may be stored, for example, a video where the start frame and the end frame are located is stored. The image information may also be jpeg (Joint Photographic Experts Group) compressed and then uploaded to the cloud via the network.

It should be noted that respective implementations in this embodiment may be implemented separately or may be implemented in any combination in the case of no conflict, which is not limited in the present application.

In the method for processing the commodity identification according to this embodiment, on the basis of the foregoing embodiments, the determination of the start frame and the end frame for the pickup behavior of the user using the easy in strict out rule avoids misjudgment resulting from the determination of the end of the pickup behavior according to the image information. Moreover, when the different region detection is performed, the comparison using the high-dimensional feature maps may solve problems such as low detection accuracy for the different region due to the binary comparison being susceptible to light.

Embodiment 3

This embodiment provides an apparatus for processing commodity identification, which is used to perform the method described above in Embodiment 1.

Figure 4:
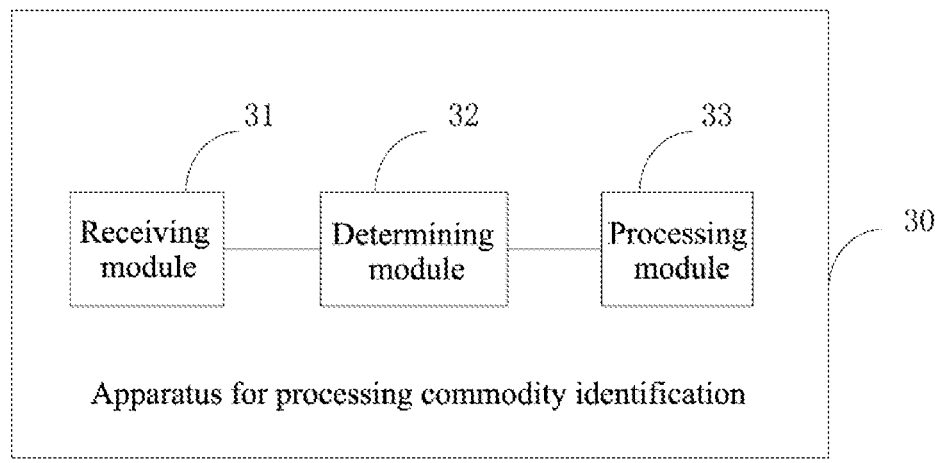
FIG. 4 is a schematic structural diagram of an apparatus for processing commodity identification according to an embodiment of the present application.

FIG. 4 shows a schematic structural diagram of an apparatus for processing commodity identification according to this embodiment. The apparatus for processing commodity identification 30 includes a receiving module 31, a determining module 32, and a processing module 33.

The receiving module 31 is configured to receive image information transmitted by a camera apparatus and a distance signal transmitted by a distance sensor corresponding to the camera apparatus; the determining module 32 is configured to determine a start frame and an end frame for a pickup behavior of a user according to the image information and the distance signal; and the processing module 33 is configured to determine, according to the start frame and the end frame for the pickup behavior of the user, information of a commodity taken by the user.

With regard to the apparatus in this embodiment, a specific manner for respective modules to perform operations has been described in detail in embodiments relating to the method, and details will not be described herein again.

In the apparatus for processing the commodity identification according to this embodiment, by performing a commodity identification on the start frame and the end frame for the pickup behavior of the user, and determining the information of the commodity taken by the user, commodity identification efficiency is effectively improved. Moreover, the determination of the start frame and the end frame for the pickup behavior of the user in conjunction with the image information captured by the camera apparatus and the distance signal detected by the distance sensor may avoid misjudgment of the pickup behavior of the user, thereby improving accuracy of judgment of the pickup behavior of the user.

Embodiment 4

This embodiment makes a further supplementation to the apparatus provided above in Embodiment 3, and is used to perform the method provided above in Embodiment 2.

As an implementation, on the basis of Embodiment 3 described above, optionally, the determining module is specifically configured to:

perform difference identification between a next frame and a preceding frame for the image information to determine whether there is a target object extends in or extends out; and determine, according to the distance signal, whether there is a target object extends in or extends out, where the next frame and the preceding frame are adjacent frames, or the next frame is spaced apart from the preceding frame by a preset number of frames.

if it is identified according to the image information that a target next frame has a target object extending in relative to a target preceding frame, then determine the target preceding frame as the start frame for the pickup behavior of the user;

if it is determined according to the distance signal that there is a target object extends in, then determine a frame in the image information corresponding to a time of the distance signal as the start frame for the pickup behavior of the user; and if it is determined according to the image information that a target next frame has a target object extending out relative to a target preceding frame and it is determined according to the distance signal that there is a target object extends out, then determine the target next frame as the end frame for the pickup behavior of the user.

Optionally, the determining module is specifically configured to: perform the difference identification between the next frame and the preceding frame for the image information using a preset first convolutional neural network CNN model, where the first convolutional neural network CNN model is trained using multiple image frames in training data and inter-frame difference annotated data.

Optionally, the determining module is specifically configured to:

compare the distance signal with a currently stored background distance signal, where the currently stored background distance signal is a stable signal transmitted by the distance sensor when there is no pickup from the user; if the distance signal has a significant jump relative to the currently stored background distance signal, then determine that there is a target object extends in; after it is determined that there is a target object extends in, if the distance signal is restored to coincide with the currently stored background distance signal, then determine that the target object extends out.

As another implementation, on the basis of Embodiment 3 described above, optionally, the processing module is specifically configured to:

enter the start frame and the end frame for the pickup behavior of the user into a preset commodity identification model to obtain a corresponding relationship between a commodity identifier and a commodity position in the start frame and the end frame, where the commodity position is a position of a commodity corresponding to the commodity identifier in the image; and determine, according to the corresponding relationship between the commodity identifier and the commodity position in the start frame and the end frame, an identifier of the commodity taken by the user.

Optionally, the processing module is further configured to perform a different region detection on the start frame and the end frame with a different region detection algorithm to obtain positional information of a different region in the end frame relative to the start frame; the processing module is specifically configured to determine, according to the positional information of the different region in the end frame relative to the start frame and the corresponding relationship between the commodity identifier and the commodity position in the start frame and the end frame, the identifier of the commodity taken by the user.

Optionally, the processing module is specifically configured to perform a binary comparison on the start frame and the end frame to obtain the positional information of the different region in the end frame relative to the start frame.

Optionally, the processing module is specifically configured to:

extract a first high-dimensional feature map of the start frame and a second high-dimensional feature map of the end frame; compare the first high-dimensional feature map with the second high-dimensional feature map to obtain a feature point having a difference; determine boundary coordinates of a different region in the second high-dimensional feature map relative to the first high-dimensional feature map according to the feature point having the difference, where the boundary coordinates are coordinates in a high-dimensional feature map coordinate system; and determine the positional information of the different region of the end frame relative to the start frame according to the boundary coordinates of the different region in the second high-dimensional feature map relative to the first high-dimensional feature map.

Optionally, the processing module is specifically configured to: extract the first high-dimensional feature map of the start frame and the second high-dimensional feature map of the end frame using a preset second CNN model.

Optionally, the processing module is specifically configured to:

for any first feature point in the first high-dimensional feature map and a second feature point in the second high-dimensional feature map having same coordinates as the first feature point, calculate a distance between the first feature point and the second feature point, if the distance between the first feature point and the second feature point is greater than a preset threshold, then determine that there is a difference between the second feature point and the first feature point, and take the second feature point as a feature point having the difference.

Optionally, the determining module is further configured to store the start frame and the end frame for the pickup behavior of the user.

With regard to the apparatus in this embodiment, a specific manner for respective modules to perform operations has been described in detail in embodiments relating to the method, and details will not be described herein again.

It should be noted that respective implementations in this embodiment may be implemented separately or may be implemented in any combination in the case of no conflict, which is not limited in the present application.

In the apparatus for processing the commodity identification according to this embodiment, on the basis of the foregoing embodiments, the determination of the start frame and the end frame for the pickup behavior of the user using an easy in strict out rule avoids misjudgment resulting from the determination of the end of the pickup behavior according to the image information. Moreover, when the different region detection is performed, the comparison using the high-dimensional feature maps may solve problems such as low detection accuracy for the different region due to the binary comparison being susceptible to light.

Embodiment 5

This embodiment provides a computer device, which is configured to perform the method according to any one of the embodiments described above.

Figure 5:
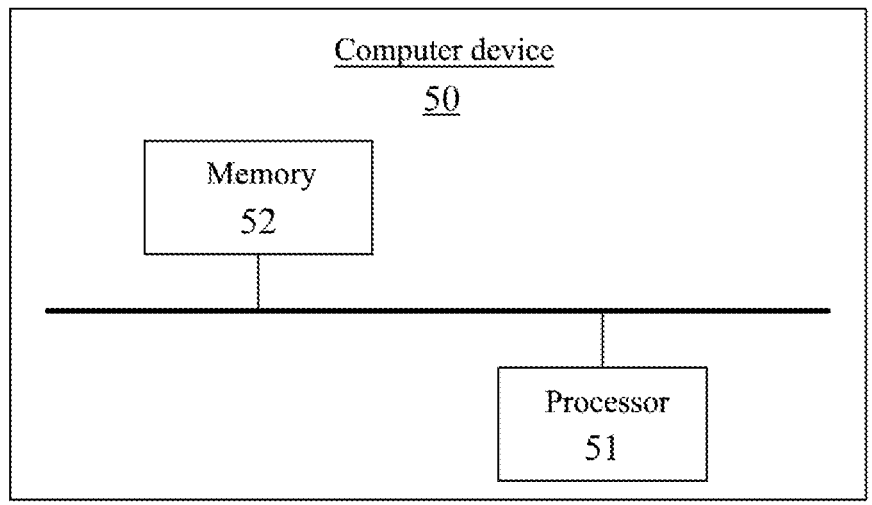
FIG. 5 is a schematic structural diagram of a computer device according to another embodiment of the present application.

FIG. 5 shows a schematic structural diagram of a computer device according to this embodiment. The computer device 50 includes: at least one processor 51 and a memory 52.

The memory is stored with a computer program; the at least one processor executes the computer program stored by the memory to implement the method according to any one of the embodiments described above.

Optionally, the computer device is an AI chip.

In the computer device according to this embodiment, by performing a commodity identification on the start frame and the end frame for the pickup behavior of the user, and determining the information of the commodity taken by the user, commodity identification efficiency is effectively improved. Moreover, the determination of the start frame and the end frame for the pickup behavior of the user in conjunction with the image information captured by the camera apparatus and the distance signal detected by the distance sensor may avoid misjudgment of the pickup behavior of the user, thereby improving accuracy of judgment of the pickup behavior of the user.

Embodiment 6

This embodiment provides a system for processing commodity identification, which may be used for commodity identification in a self-service retail mode.

Figure 6:
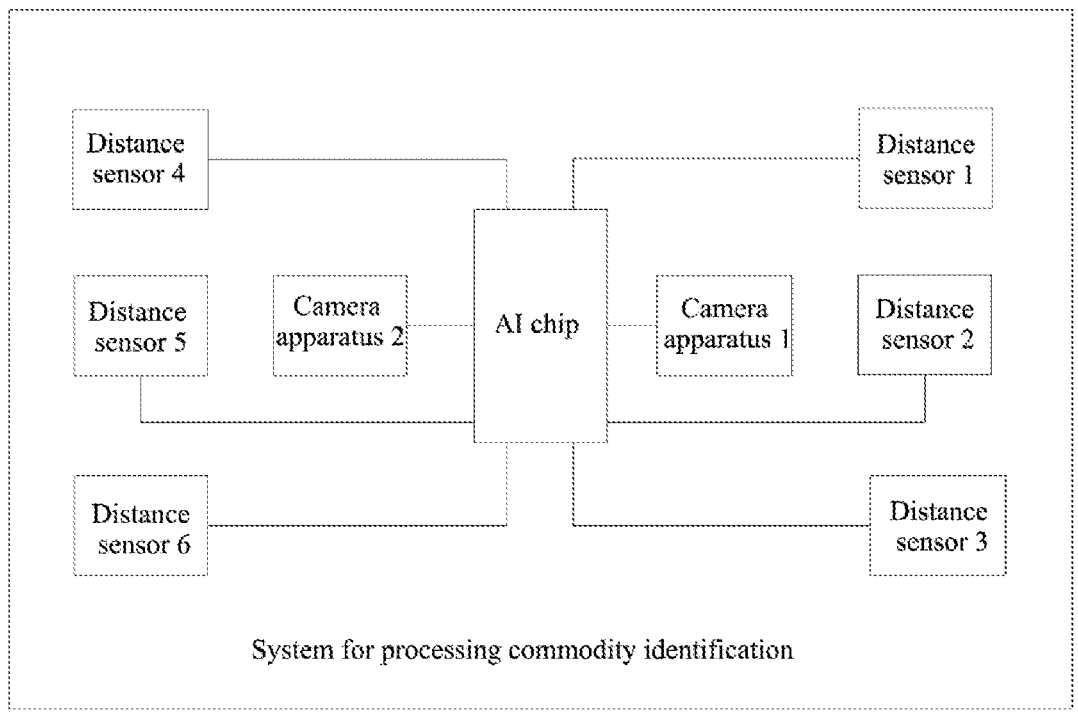
FIG. 6 is a schematic structural diagram of a system for processing commodity identification according to an embodiment of the present application.

FIG. 6 shows a schematic structural diagram of a system for processing commodity identification according to this embodiment. The system for processing the commodity identification includes an AI chip, one or more camera apparatuses, and one or more distance sensors.

Each of the camera apparatuses corresponds to one or more distance sensors; each of the camera apparatuses is connected to the AI chip, and configured to transmit collected image information of a commodity to the AI chip; each of the distance sensors is connected to the AI chip, and configured to transmit a detected distance signal to the AI chip; the AI chip is configured to execute a computer program to implement the method according to Embodiment 1 or Embodiment 2.

In the system for processing the commodity identification according to this embodiment, by performing a commodity identification on the start frame and the end frame for the pickup behavior of the user, and determining the information of the commodity taken by the user, commodity identification efficiency is effectively improved. Moreover, the determination of the start frame and the end frame for the pickup behavior of the user in conjunction with the image information captured by the camera apparatus and the distance signal detected by the distance sensor may avoid misjudgment of the pickup behavior of the user, thereby improving accuracy of judgment of the pickup behavior of the user.

Embodiment 7

This embodiment provides a computer readable storage medium stored with a computer program, which, when being executed, causes the method according to any one of the embodiments described above to be implemented.

In the computer readable storage medium according to this embodiment, by performing a commodity identification on the start frame and the end frame for the pickup behavior of the user, and determining the information of the commodity taken by the user, commodity identification efficiency is effectively improved. Moreover, the determination of the start frame and the end frame for the pickup behavior of the user in conjunction with the image information captured by the camera apparatus and the distance signal detected by the distance sensor may avoid misjudgment of the pickup behavior of the user, thereby improving accuracy of judgment of the pickup behavior of the user.

In several embodiments provided in the present application, it should be understood that the disclosed apparatus and method may be implemented in other manners. For example, the described apparatus embodiment is merely exemplary. For example, the unit division is merely a logical function division and may be other divisions in actual implementations. For example, multiple units or components may be combined or integrated into another system, or some features may be ignored or not performed. In addition, the displayed or discussed mutual couplings or direct couplings or communication connections may be implemented through some interfaces. The indirect couplings or communication connections between apparatuses or units may be implemented in electronic, mechanical, or other forms.

The units described as separate parts may or may not be physically separate, and parts displayed as units may or may not be physical units, that is, may be located in one position, or may be distributed on multiple network units. A part or all of the units may be selected according to actual needs to achieve the objectives of the solutions of the embodiments.

In addition, functional units in the embodiments of the present application may be integrated into one processing unit, or each of the units may exist alone physically, or two or more than two units are integrated into one unit. The integrated unit may be implemented in a form of hardware, or may be implemented in a form of a software plus hardware functional unit.

The integrated unit implemented above in the form of the software functional unit may be stored in a computer-readable storage medium. The software functional unit described above is stored in a storage medium, and includes several instructions for instructing a computer device (which may be a personal computer, a server, or a network device) or a processor to perform a part of the steps of the methods described in the embodiments of the present application. The foregoing storage medium includes: any medium that can store program codes, such as a USB flash disk, a mobile hard disk, a read-only memory (Read-Only Memory, ROM), a random access memory (Random Access Memory, RAM), a magnetic disk, or an optical disc.

It may be well known to persons skilled in the art that, for the purpose of convenient and brief description, an illustration is made only to the division of the above functional modules, during practical use, the above functions may be assigned to different functional modules as needed, that is, the internal structure of the apparatus is divided into different functional modules to complete a part of or all of the above described functions. For a detailed working process of the apparatus described above, reference may be made to the corresponding process in the foregoing method embodiments, and details will not be described herein again.

Finally, it should be noted that the foregoing embodiments are merely intended for describing the technical solutions of the present application other than limiting the present application. Although the present application is described in detail with reference to the foregoing embodiments, persons skilled in the art should understand that modifications may still be made to the technical solutions described in the foregoing embodiments, or equivalent replacements may be made to some or all technical features therein; however, these modifications or replacements do not make the essence of corresponding technical solutions depart from the scope of the technical solutions in the embodiments of the present application.

What is claimed is:

1. A method for processing commodity identification, comprising:
   receiving image information transmitted by a camera apparatus and a distance signal transmitted by a distance sensor corresponding to the camera apparatus;
   determining a start frame and an end frame for a pickup behavior of a user according to the image information and the distance signal; and
   determining, according to the start frame and the end frame for the pickup behavior of the user, information of a commodity taken by the user;
   wherein the determining the start frame and the end frame for the pickup behavior of the user according to the image information and the distance signal comprises:
   performing difference identification between a next frame and a preceding frame for the image information to determine whether there is a target object extends in or extends out; and determining, according to the distance signal, whether there is a target object extends in or extends out, wherein the next frame and the preceding frame are adjacent frames, or the next frame is spaced apart from the preceding frame by a preset number of frames;
   if it is identified according to the image information that a target next frame has a target object extending in relative to a target preceding frame, then determining the target preceding frame as the start frame for the pickup behavior of the user;
   if it is determined according to the distance signal that there is a target object extends in, then determining a frame in the image information corresponding to a time of the distance signal as the start frame for the pickup behavior of the user; and
   if it is determined according to the image information that a target next frame has a target object extending out relative to a target preceding frame and it is determined according to the distance signal that there is a target object extends out, then determining the target next frame as the end frame for the pickup behavior of the user.

2. The method according to claim 1, wherein the performing the difference identification between the next frame and the preceding frame for the image information comprises:
   performing the difference identification between the next frame and the preceding frame for the image information using a preset first convolutional neural network (CNN) model, wherein the first CNN model is trained using multiple image frames in training data and inter-frame difference annotated data.

3. The method according to claim 1, wherein the determining, according to the distance signal, whether there is a target object extends in or extends out comprises:
   comparing the distance signal with a currently stored background distance signal, wherein the currently stored background distance signal is a stable signal transmitted by the distance sensor when there is no pickup from the user;
   if the distance signal has a significant jump relative to the currently stored background distance signal, then determining that there is a target object extends in;
   after it is determined that there is a target object extends in, if the distance signal is restored to coincide with the currently stored background distance signal, then determining that the target object extends out.

4. The method according to claim 1, wherein the determining, according to the start frame and the end frame for the pickup behavior of the user, the information of the commodity taken by the user comprises:
   entering the start frame and the end frame for the pickup behavior of the user into a preset commodity identification model to obtain a corresponding relationship between a commodity identifier and a commodity position in the start frame and the end frame, wherein the commodity position is a position of a commodity corresponding to the commodity identifier in the image; and
   determining, according to the corresponding relationship between the commodity identifier and the commodity position in the start frame and the end frame, an identifier of the commodity taken by the user.

5. The method according to claim 4, before the determining, according to the corresponding relationship between the commodity identifier and the commodity position in the start frame and the end frame, the identifier of the commodity taken by the user, further comprising:
   performing a different region detection on the start frame and the end frame with a different region detection algorithm to obtain positional information of a different region in the end frame relative to the start frame;
   correspondingly, the determining, according to the corresponding relationship between the commodity identifier and the commodity position in the start frame and the end frame, the identifier of the commodity taken by the user comprises:
   determining, according to the positional information of the different region in the end frame relative to the start frame and the corresponding relationship between the commodity identifier and the commodity position in the start frame and the end frame, the identifier of the commodity taken by the user.

6. The method according to claim 5, wherein the performing the different region detection on the start frame and the end frame with the different region detection algorithm to obtain the positional information of the different region in the end frame relative to the start frame comprises:
  extracting a first high-dimensional feature map of the start frame and a second high-dimensional feature map of the end frame;
  comparing the first high-dimensional feature map with the second high-dimensional feature map to obtain a feature point having a difference;
  determining boundary coordinates of a different region in the second high-dimensional feature map relative to the first high-dimensional feature map according to the feature point having the difference, wherein the boundary coordinates are coordinates in a high-dimensional feature map coordinate system; and
  determining the positional information of the different region of the end frame relative to the start frame according to the boundary coordinates of the different region in the second high-dimensional feature map relative to the first high-dimensional feature map.

7. The method according to claim 6, wherein the extracting the first high-dimensional feature map of the start frame and the second high-dimensional feature map of the end frame comprises:
  extracting the first high-dimensional feature map of the start frame and the second high-dimensional feature map of the end frame using a preset second CNN model.

8. The method according to claim 6, wherein the comparing the first high-dimensional feature map with the second high-dimensional feature map to obtain the feature point having the difference comprises:
  for any first feature point in the first high-dimensional feature map and a second feature point in the second high-dimensional feature map having same coordinates as the first feature point, calculating a distance between the first feature point and the second feature point, if the distance between the first feature point and the second feature point is greater than a preset threshold, then determining that there is a difference between the second feature point and the first feature point, and taking the second feature point as the feature point having the difference.

9. The method according to claim 1, wherein after the determining the start frame and the end frame for the pickup behavior of the user according to the image information and the distance signal, further comprising:
  storing the start frame and the end frame for the pickup behavior of the user.

10. A system for processing commodity identification, comprising: an artificial intelligence (AI) chip, one or more camera apparatuses, and one or more distance sensors;
  wherein each of the camera apparatuses corresponds to one or more distance sensors;
  each of the camera apparatuses is connected to the AI chip, and configured to transmit collected image information of a commodity to the AI chip;
  each of the distance sensors is connected to the AI chip, and configured to transmit a detected distance signal to the AI chip;
  the AI chip is configured to execute a computer program to implement the method according to claim 1.

11. An apparatus for processing commodity identification, comprising:
  a memory, a processor, and a computer program stored on the memory and operable on the processor,
  wherein the processor, when running the computer program, is configured to:
  receive image information transmitted by a camera apparatus and a distance signal transmitted by a distance sensor corresponding to the camera apparatus;
  determine a start frame and an end frame for a pickup behavior of a user according to the image information and the distance signal; and
  determine, according to the start frame and the end frame for the pickup behavior of the user, information of a commodity taken by the user;
  wherein the processor is configured to:
  perform difference identification between a next frame and a preceding frame for the image information to determine whether there is a target object extends in or extends out; and determine, according to the distance signal, whether there is a target object extends in or extends out, wherein the next frame and the preceding frame are adjacent frames, or the next frame is spaced apart from the preceding frame by a preset number of frames;
  if it is identified according to the image information that a target next frame has a target object extending in relative to a target preceding frame, then determine the target preceding frame as the start frame for the pickup behavior of the user;
  if it is determined according to the distance signal that there is a target object extends in, then determine a frame in the image information corresponding to a time of the distance signal as the start frame for the pickup behavior of the user; and
  if it is determined according to the image information that a target next frame has a target object extending out relative to a target preceding frame and it is determined according to the distance signal that there is a target object extends out, then determine the target next frame as the end frame for the pickup behavior of the user.

12. The apparatus according to claim 11, wherein the processor is configured to: perform the difference identification between the next frame and the preceding frame for the image information using a preset first convolutional neural network (CNN) model, wherein the first CNN model is trained using multiple image frames in training data and inter-frame difference annotated data.

13. The apparatus according to claim 11, wherein the processor is configured to:
  compare the distance signal with a currently stored background distance signal, wherein the currently stored background distance signal is a stable signal transmitted by the distance sensor when there is no pickup from the user;
  if the distance signal has a significant jump relative to the currently stored background distance signal, then determine that there is a target object extends in;
  after it is determined that there is a target object extends in, if the distance signal is restored to coincide with the currently stored background distance signal, then determine that the target object extends out.

14. The apparatus according to claim 11, the processor is configured to:
  enter the start frame and the end frame for the pickup behavior of the user into a preset commodity identification model to obtain a corresponding relationship between a commodity identifier and a commodity position in the start frame and the end frame, wherein the commodity position is a position of a commodity corresponding to the commodity identifier in the image; and determine, according to the corresponding relationship between the commodity identifier and the commodity position in the start frame and the end frame, an identifier of the commodity taken by the user.

15. The apparatus according to claim 14, the processor is further configured to perform a different region detection on the start frame and the end frame with a different region detection algorithm to obtain positional information of a different region in the end frame relative to the start frame;
the processor is configured to determine, according to the positional information of the different region in the end frame relative to the start frame and the corresponding relationship between the commodity identifier and the commodity position in the start frame and the end frame, the identifier of the commodity taken by the user.

16. The apparatus according to claim 15, wherein the processor is configured to:
extract a first high-dimensional feature map of the start frame and a second high-dimensional feature map of the end frame;
compare the first high-dimensional feature map with the second high-dimensional feature map to obtain a feature point having a difference;
determine boundary coordinates of a different region in the second high-dimensional feature map relative to the first high-dimensional feature map according to the feature point having the difference, wherein the boundary coordinates are coordinates in a high-dimensional feature map coordinate system; and
determine the positional information of the different region of the end frame relative to the start frame according to the boundary coordinates of the different region in the second high-dimensional feature map relative to the first high-dimensional feature map.

17. The apparatus according to claim 16, wherein the processor is configured to: extract the first high-dimensional feature map of the start frame and the second high-dimensional feature map of the end frame using a preset second CNN model.

18. The apparatus according to claim 16, wherein the processor is configured to:
for any first feature point in the first high-dimensional feature map and a second feature point in the second high-dimensional feature map having same coordinates as the first feature point, calculate a distance between the first feature point and the second feature point, if the distance between the first feature point and the second feature point is greater than a preset threshold, then determine that there is a difference between the second feature point and the first feature point, and take the second feature point as a feature point having the difference.

* * * * *